(12) United States Patent
Kim

(10) Patent No.: US 8,031,863 B2
(45) Date of Patent: Oct. 4, 2011

(54) APPARATUS AND METHOD FOR CONTROLLING ACOUSTIC ECHO CANCELLATION IN MOBILE COMMUNICATION TERMINAL

(75) Inventor: Ki-Pyoung Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1238 days.

(21) Appl. No.: 11/717,755

(22) Filed: Mar. 14, 2007

(65) Prior Publication Data

US 2007/0217600 A1    Sep. 20, 2007

(30) Foreign Application Priority Data

Mar. 16, 2006    (KR) ................ 10-2006-0024466

(51) Int. Cl.
*H04M 9/08*    (2006.01)
(52) U.S. Cl. .................................. 379/406.07
(58) Field of Classification Search .............. 379/406.07
See application file for complete search history.

(56) References Cited

U.S. PATENT DOCUMENTS

| | | | | |
|---|---|---|---|---|
| 4,229,735 A | * | 10/1980 | Houck | 340/676 |
| 5,016,271 A | * | 5/1991 | Ford | 379/406.15 |
| 5,715,309 A | * | 2/1998 | Bartkowiak | 379/406.07 |
| 5,982,755 A | * | 11/1999 | Forrester et al. | 370/278 |

* cited by examiner

*Primary Examiner* — Alexander Jamal
(74) *Attorney, Agent, or Firm* — Birch, Stewart, Kolasch & Birch, LLP

(57) ABSTRACT

An apparatus and method for controlling acoustic echo cancellation in a mobile communication terminal are capable of improving phenomena occurring during a call, such as an echo phenomenon, muting phenomenon and fluctuation of transmitting signals, by performing real-time monitoring of the signal of a speaker output stage and effectively controlling an AEC function according to the characteristics of the terminal. The level of a receiving signal which is outputted to a speaker is detected. A transmitting signal, which is outputted from a microphone, is converted into a digital voice signal. A certain attenuation value is adaptively determined depending on the detected level of the receiving signal, and attenuation on transmitting signal is controlled according to the determined attenuation value.

19 Claims, 5 Drawing Sheets

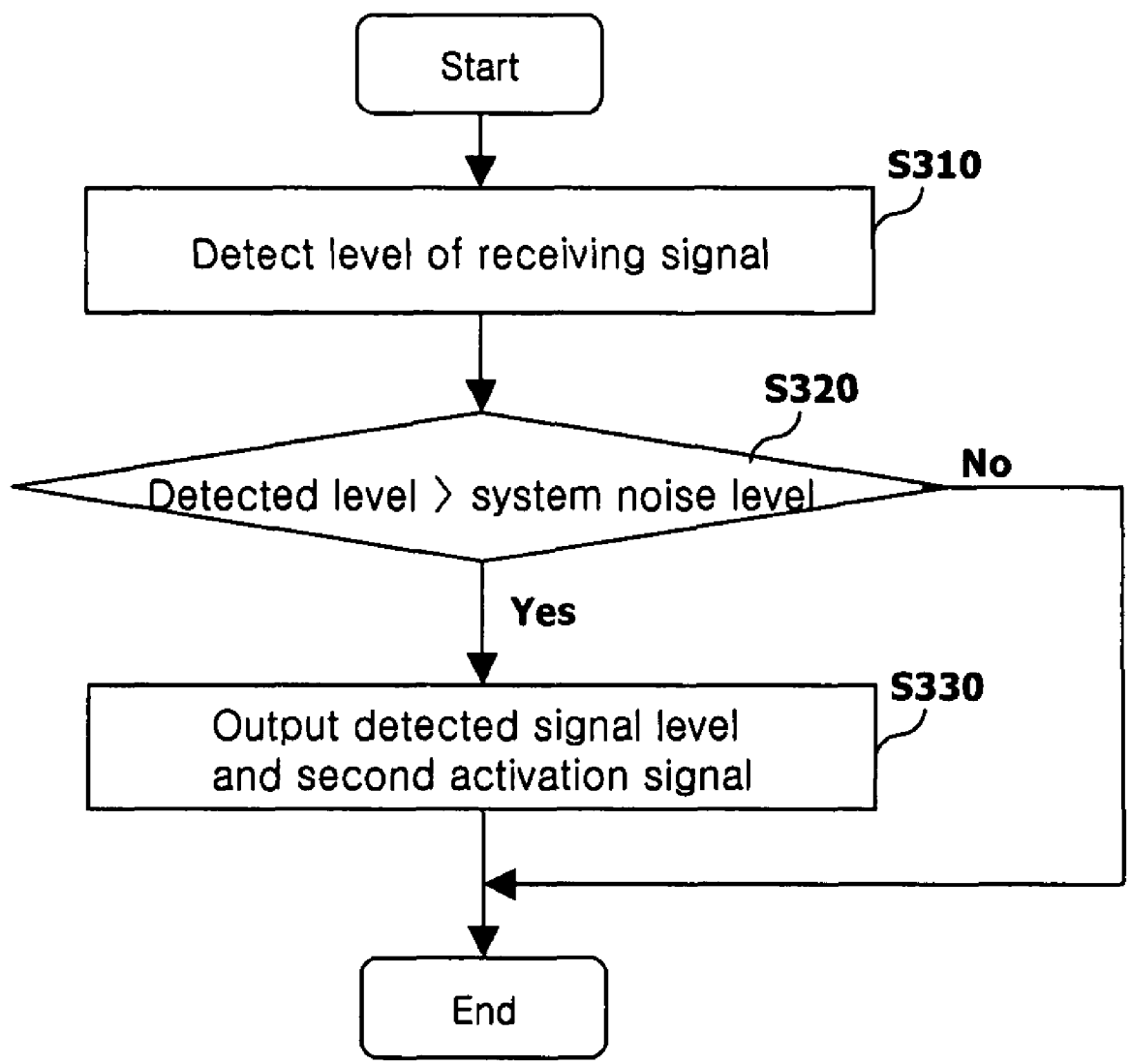

APPARATUS AND METHOD FOR CONTROLLING ACOUSTIC ECHO CANCELLATION IN MOBILE COMMUNICATION TERMINAL

BACKGROUND OF THE INVENTION

1. Field of the Invention

The present invention relates to a mobile communication terminal, and more particularly, to an apparatus and method for controlling acoustic echo cancellation which is capable of improving an acoustic echo cancellation function which is used in the mobile communication terminal.

2. Description of the Related Art

In general, as mobile communication terminals are being made smaller in size for being more easily carried, the distance between a speaker unit for outputting voice signals and a microphone unit for inputting voice signals becomes shorter. When voice signals are received from a far-end user and outputted to the speaker unit, the outputted sound voice may be picked up by the microphone unit and then transmitted back to the far-end user. This may cause what is called an "acoustic echo phenomenon."

In the acoustic echo phenomenon, when a voice signal is applied from a downlink path to an uplink path and then amplified again, the level of transmitting (electric) power is greatly fluctuated, and accordingly causes a problem that a near-end user cannot recognize well voice signals received from the far-end user.

Accordingly, there has been recently increased the need for developing technologies that can help eliminate problems of the echo phenomenon occurring in mobile communication terminals, in particular, in small-sized mobile communication terminals.

SUMMARY OF THE INVENTION

Therefore, an object of the present invention is to provide an apparatus and method for improving an acoustic echo cancellation function in a mobile communication terminal capable of eliminating more effectively an echo phenomenon of a voice signal transmitted through an uplink path.

To achieve these and other advantages and in accordance with the purpose of the present invention, as embodied and broadly described herein, there is provided an apparatus for improving acoustic echo cancellation in a mobile communication terminal, comprising: a down-analog unit which converts a receiving signal inputted through a downlink path into an analog signal and outputs the analog signal to a speaker; a level detecting unit which detects a level of the analog receiving signal outputted to the speaker; an up-analog unit which converts a transmitting signal into a digital voice signal, the transmitting signal being outputted from a microphone; and an acoustic echo canceller which determines a certain attenuation value adaptively based on the detected level of the analog receiving signal, and attenuates the transmitting signal according to the determined attenuation value.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is a flowchart showing the method steps for detecting a signal transmitted through a downlink path.

DETAILED DESCRIPTION OF THE INVENTION

Reference will now be made in detail to the preferred embodiments of the present invention, examples of which are illustrated in the accompanying drawings.

In describing the present invention, if a detailed explanation for a related known function or construction is considered to unnecessarily divert from the gist of the present invention, such explanation is omitted.

The present invention provides a method for improving not only a mute phenomenon or fluctuation of a transmitting sound but also an echo phenomenon during a call, by effectively controlling operating an Acoustic Echo Cancellation (AEC) function according to the characteristics of a terminal.

Figure 1:
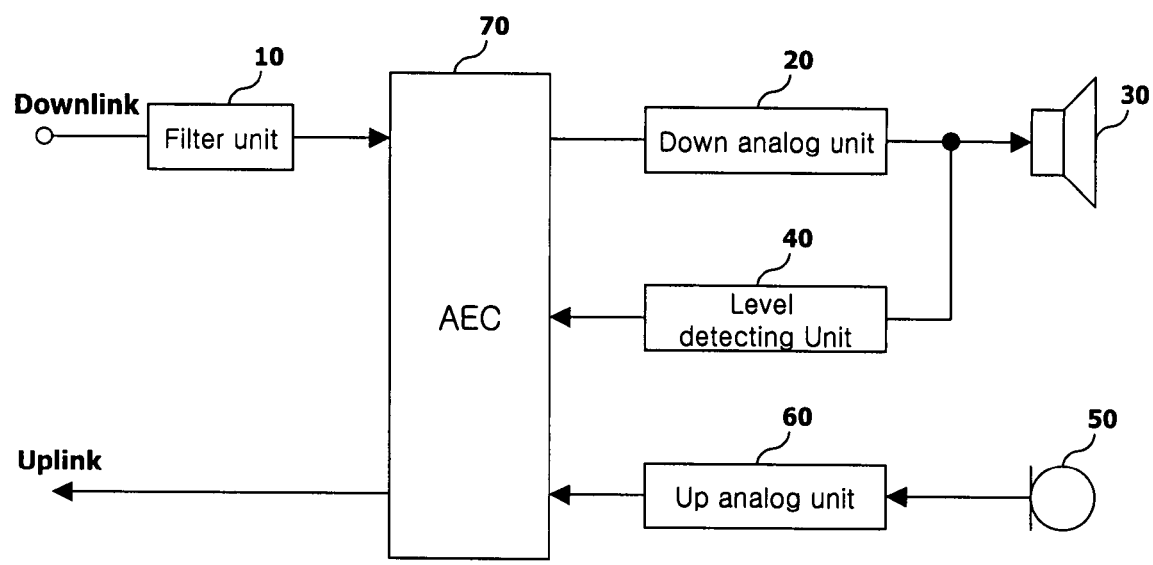
FIG. 1 is a schematic block diagram showing the structure of an apparatus for controlling acoustic echo cancellation in a mobile communication terminal according to the present invention.

FIG. 1 is a block diagram showing the structure of an apparatus for controlling acoustic echo cancellation in a mobile communication terminal according to the present invention.

Referring to FIG. 1, the apparatus for controlling acoustic echo cancellation in a mobile communication terminal according to the present invention includes: a filter unit 10 that compensates a frequency response of a received digital baseband (DBB) voice signal; a down-analog unit 20 that converts the digital voice signal outputted from the filter unit 10 into an analog baseband (ABB) voice signal to output to a speaker 30; a level detecting unit 40 that detects the level of the output voice signal which is outputted to the speaker 30; an up-analog unit 60 that amplifies and converts an analog voice signal (transmitting signal) from a microphone 50 into a digital signal; and an acoustic echo canceller 70 that applies different attenuation values to outputs of the filter unit 10 and the up-analog unit 60 according to the level of the output voice signal detected by the level detecting unit 40 to precisely control an acoustic echo cancellation function.

Figure 2:
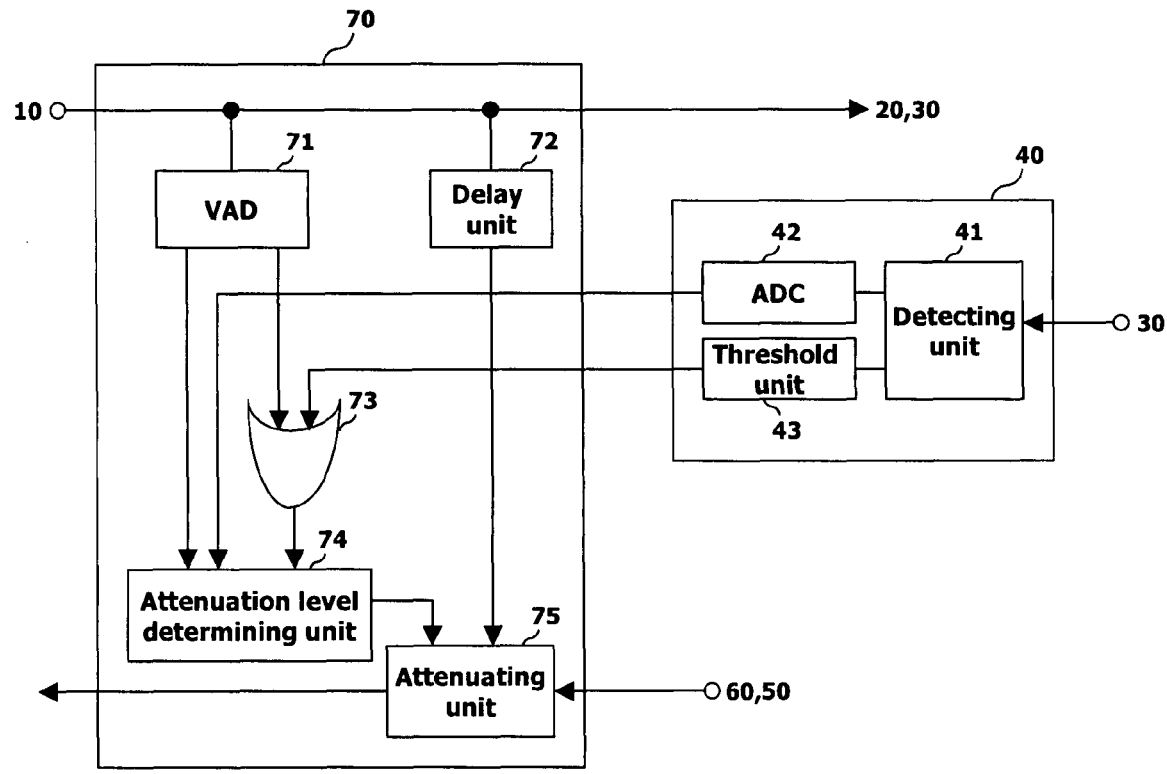
FIG. 2 is a schematic block diagram showing the detailed structure of an acoustic echo canceller and a level detecting unit in FIG. 1.

As shown in FIG. 2, the level detecting unit 40 includes a detecting unit 41 that detects the level (e.g., DC level) of the analog voice signal which is outputted to the speaker 30, that is, the signal energy level; an analog-to-digital converter (ADC) 42 that converts the detected voice signal into a digital signal (e.g., Hexadecimal code); and a threshold unit 43 that compares the detected level of the voice signal with a preset threshold level so as to output a first activation signal.

Preferably, the detecting unit 41 may include a rectifier circuit having a resistor (R) and a capacitor (C). The threshold level set in the threshold unit 43 may be determined experimentally and also may be made appropriately adjustable.

The acoustic echo canceller 70 includes a voice activity detector (VAD) 71 that detects the level of the digital voice signal received through the downlink path and compares the detected level of the voice signal with a preset noise level of the system, thereby generating a second activation signal; a delay unit 72 that delays the received digital voice signal; a logic unit 73 that logically operates upon the first activation signal outputted from the threshold unit 46 and the second activation signal outputted from the VAD 71 to output an enable signal; an attenuation value determining unit 74 that is operated by the enable signal outputted from the logic unit 73 and determines the certain attenuation value based on the level of the output voice signal detected in the level detecting unit 40; and an attenuating unit 75 that attenuates the outputs of the filter unit 10 and the up-analog unit 60 according to the attenuation value outputted from the attenuation value determining unit 74, thusly to transmit the transmitting signal through the uplink path.

Preferably, the filter unit 10 may be a Finite Impulse Response (FIR) filter, and the logic unit 73 may be an OR gate.

Figure 3:
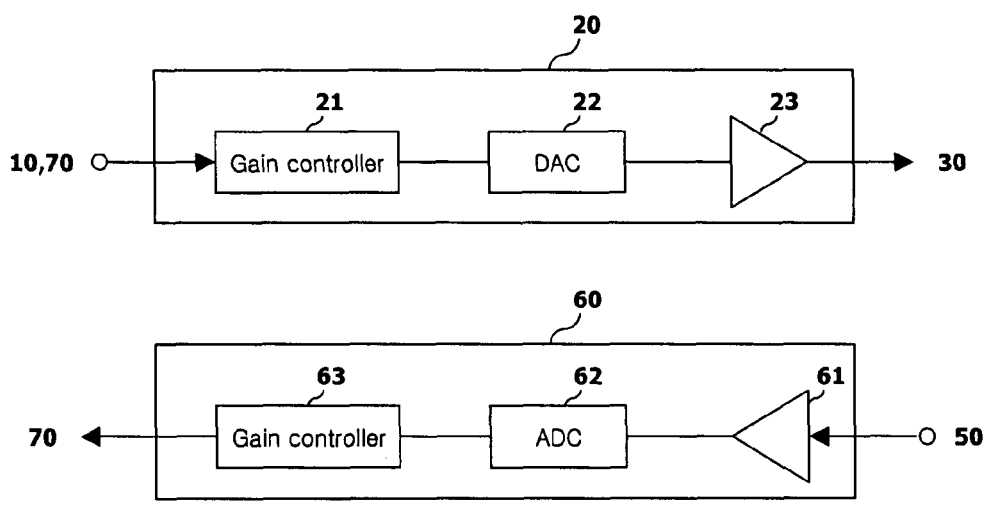
FIG. 3 is a block diagram showing the detailed functional structures of a down-analog unit and an up-analog unit in FIG. 1.

Referring to FIG. 3, the down-analog unit 20 includes a gain controller 21 that controls the gain of the voice signal outputted from the filter unit 10, a digital-to-analog converter (DAC) 22 that converts the gain-controlled voice signal into a digital voice signal, and an amplifying unit 23 that amplifies the thusly converted digital voice signal.

The up-analog unit 60 includes an amplifying unit 61 that amplifies the voice signal outputted from the microphone 50, an analog-to-digital converter (ADC) 62 that converts the amplified voice signal into a digital signal, and a gain controller 63 that amplifies the digital voice signal.

Further, the above-mentioned "downlink path" refers to the path for voice reception coming from a far-end user during a call, while the "up-link path" refers to the path for voice transmission from a near-end user.

With the aforementioned structures, reference will now be made to the operation of the apparatus for controlling acoustic echo cancellation in a mobile communications terminal.

A mobile communication terminal receives a receiving signal (a voice signal of a far-end user or audio signal) which is transmitted through the downlink path using an RF unit. The receiving signal, as a digital signal, includes a harmonic noise signal component when demodulated in the RF unit.

Accordingly, the filter unit 10 passes through digital voice signals only in the frequency band less than 4 KHz, but blocks other voice signals in other frequency bands, thereby eliminating the harmonic noise signal component included in the receiving digital voice signal.

The digital baseband (DBB) voice signal, with the harmonic noise signal component being eliminated therefrom by the filter unit 10, is inputted to the acoustic echo canceller (AEC) 70 and therefrom, to the down-analog unit 20, respectively. The down-analog unit 20 converts the inputted digital voice signal into an analog baseband (ABB) voice signal to output same to the speaker 30. Here, as shown in FIG. 3, the gain controller 21 of the down-analog unit 20 controls the gain of the digital voice signal which is outputted from the AEC 70. The DAC 22 converts the gain-controlled digital voice signal into an analog voice signal. The amplifying unit 23 amplifies the converted analog voice signal to output same to the speaker 30.

However, since the speaker 30 and the microphone 50 are arranged close to each other in the mobile communication terminal, voice signals which are received from a far-end user through the downlink path and outputted from the speaker 30, may enter the microphone 50 and then be transmitted back to the far-end user, which results in causing the aforesaid "acoustic echo phenomenon."

The analog voice signal outputted from the microphone 50 is amplified in the up-analog unit 60 and then is converted into a digital signal, thusly to be inputted to the acoustic echo canceller 70. In this case, the amplifying unit 61 of the up-analog unit 60 amplifies the analog voice signal which is outputted from the microphone 50. The ADC 62 converts the amplified analog voice signal into a digital signal. The gain controller 63 amplifies the thusly converted digital voice signal to output same to AEC 70.

During the above-mentioned operations, the level detecting unit 40 detects the level of the voice signal outputted to the speaker 30 to output the detected level of the voice signal and the first activation signal to the acoustic echo canceller 70. The reason to detect the speaker output is in order to take into consideration the volume gain of the speaker output stage. That is, a related art AEC algorithm processed the AEC function on the basis of the voice signal demodulated in the RF unit, that is, the voice signal of the digital baseband (ABB after a DBB stage and a voice gain of a peripheral circuit). This severely caused a muting phenomenon that eliminated even the transmitting sounds during a call and the fluctuation of the transmitting sounds.

Accordingly, as shown in FIG. 2, in the present invention, the detecting unit 41 is used to detect the signal which is outputted to the speaker 30, and the ADC 42 is used to convert the level of the detected signal into Hexadecimal code of 10-bit resolution for separation, thereby outputting the detected value to the acoustic echo canceller 70. Here, the threshold unit 43 compares the level of the voice signal detected by the detecting unit 41 with a preset threshold level. According to the comparison result, if the detected level of the voice signal is greater than the preset threshold level, the first activation signal is outputted to the acoustic echo canceller 70.

As described above, the digital baseband receiving voice signal, with a harmonic noise signal component being eliminated therefrom by the filter unit 10, is inputted to the acoustic echo canceller 70 as well as to the down-analog unit 20.

As shown in FIG. 2, the Voice Activity Detector (VAD) 71 of the acoustic echo canceller 70 detects the level of the inputted digital voice signal from filter unit 10 and compares the detected level of the voice signal with the preset noise level of the system. When the detected level of the voice signal is greater than the preset noise level of the system, the second activation signal is generated.

The logic unit 73 performs an ORing operation on the first activation signal which is outputted from the threshold unit 43 of the level detecting unit 40 and the second activation signal which is outputted from the VAD 71 so as to output an enable signal. That is, the function of the logic unit 73 is to output an enable signal for operating the attenuation value determining unit 74 when the level of the DBB receiving voice signal inputted through the downlink is greater than the preset noise level of the system or when the level of the ABB receiving voice signal detected from the stage of the speaker 30 is greater than the preset threshold level.

The attenuation value determining unit 74 is operated by the enable signal which is outputted from the logic unit 73, and determines an echo suppression level value (or an attenuation value) corresponding to the level (e.g. Hex code value) of the transmitting voice signal which is outputted from the ADC 42 of the level detecting unit 40 from a Hexadecimal code table, thusly to output a control value to the attenuating unit 75. The following [Table 1] describes an example of such a Hex code table.

TABLE 1

| | Speaker Output | Detecting unit Output | ADC Output (Hex value) | Attenuation (Hex value) |
|---|---|---|---|---|
| 1) | 3 Vpp | 1.5 V | 0X3FF | OX7FF |
| 2) | 2 Vpp | 1 V | OX1FF | OX400 |
| 3) | 1 Vpp | 0.5 V | OXOFF | OX100 |
| 4) | 0 Vpp | 0 V | OXOO | OX00 |

Data in the Hexadecimal code table is determined by experimentations and may be changed according to the characteristics of the circuit structure in a mobile communication terminal. As an example, data in the code table can be changed according to a peripheral circuit of the detecting unit 41. The speaker output value is based on a single tone signal generated by a signal generator. Accordingly, during actual calls, the speaker output value may assume various levels depending on the circumstances, which requires more detailed mapping of the Hex code table.

Therefore, the attenuating unit 75 attenuates the output of the up-analog unit 60 according to the attenuation value outputted from the attenuation value determining unit 74, to transfer a transmitting signal through the uplink path. In this case, the delay unit 72 outputs an output signal of the filter unit 10 with a certain time delay. The delay time corresponds to the time taken until the output signal of the filter unit 10 passes through the speaker 30, and then is inputted back into the acoustic echo canceller 70 via the microphone 50 and the up-analog unit 60.

That is, if an attenuation value is inputted from the attenuation value determining unit 74, the attenuating unit 75 subtracts the receiving voice signal of the same phase applied from the delay unit 72 from the transmitting voice signal applied from the up-analog unit 60. According to the attenuation value, the attenuating unit 75 attenuates the voice signal. And, if an attenuation value is not inputted from the attenuation value determining unit 74, the attenuation is performed by removing a voice signal of the same phase and based on a preset attenuation value (an existing attenuation value determined according to the level of the voice signal detected by the VAD 71). Here, the delay unit 72 outputs an output signal of the filter unit 10 with a certain time delay. The delay time corresponds to the time taken for the output signal of the filter unit 10 to be sounded through the speaker 30, and then be inputted back into the acoustic echo canceller 70 via the microphone 50 and the down-analog unit 20.

Therefore, the present invention according to the above-described operations has an effect to minimize a muting phenomenon of transmitting signals or the fluctuation by performing a real-time monitoring of the signal of the speaker output stage and controlling the AEC algorithm.

Reference will now be made in detail to the method for improving acoustic echo cancellation in a mobile communication terminal of the present invention, examples of which are illustrated in the accompanying drawings.

Figure 4:
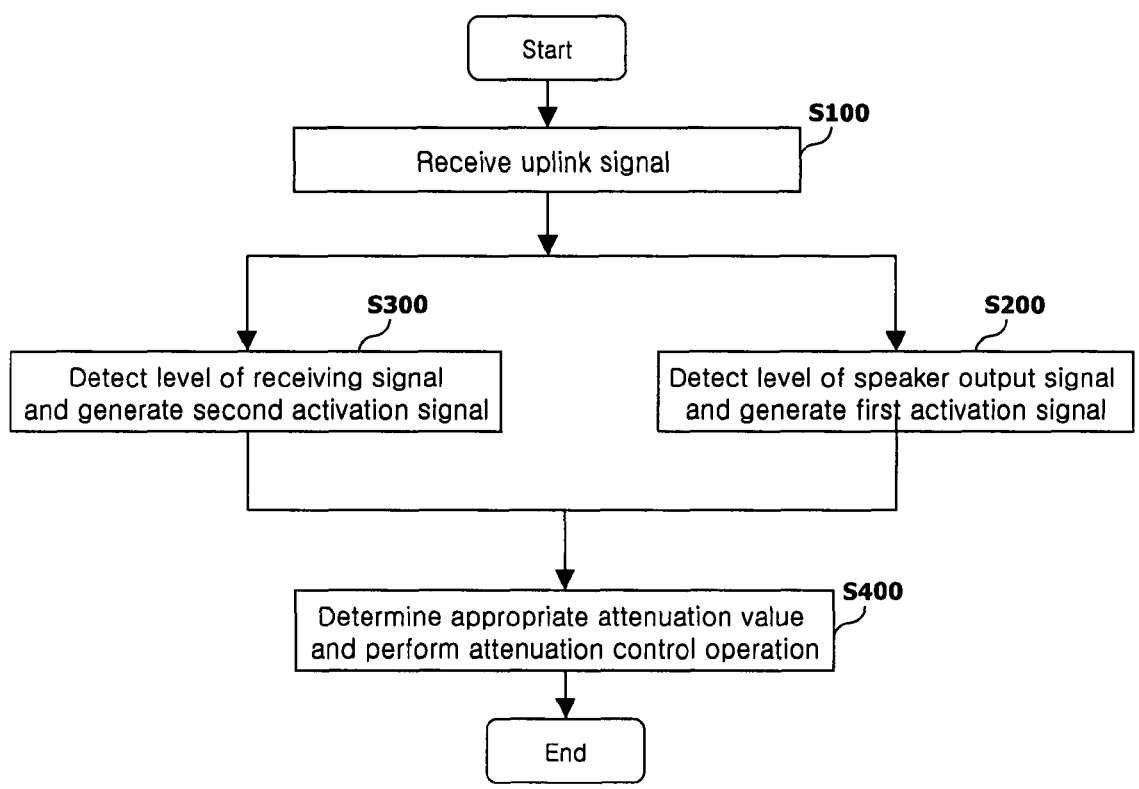
FIG. 4 is a flowchart showing the method steps for controlling acoustic echo cancellation according to the present invention.
Figure 5:
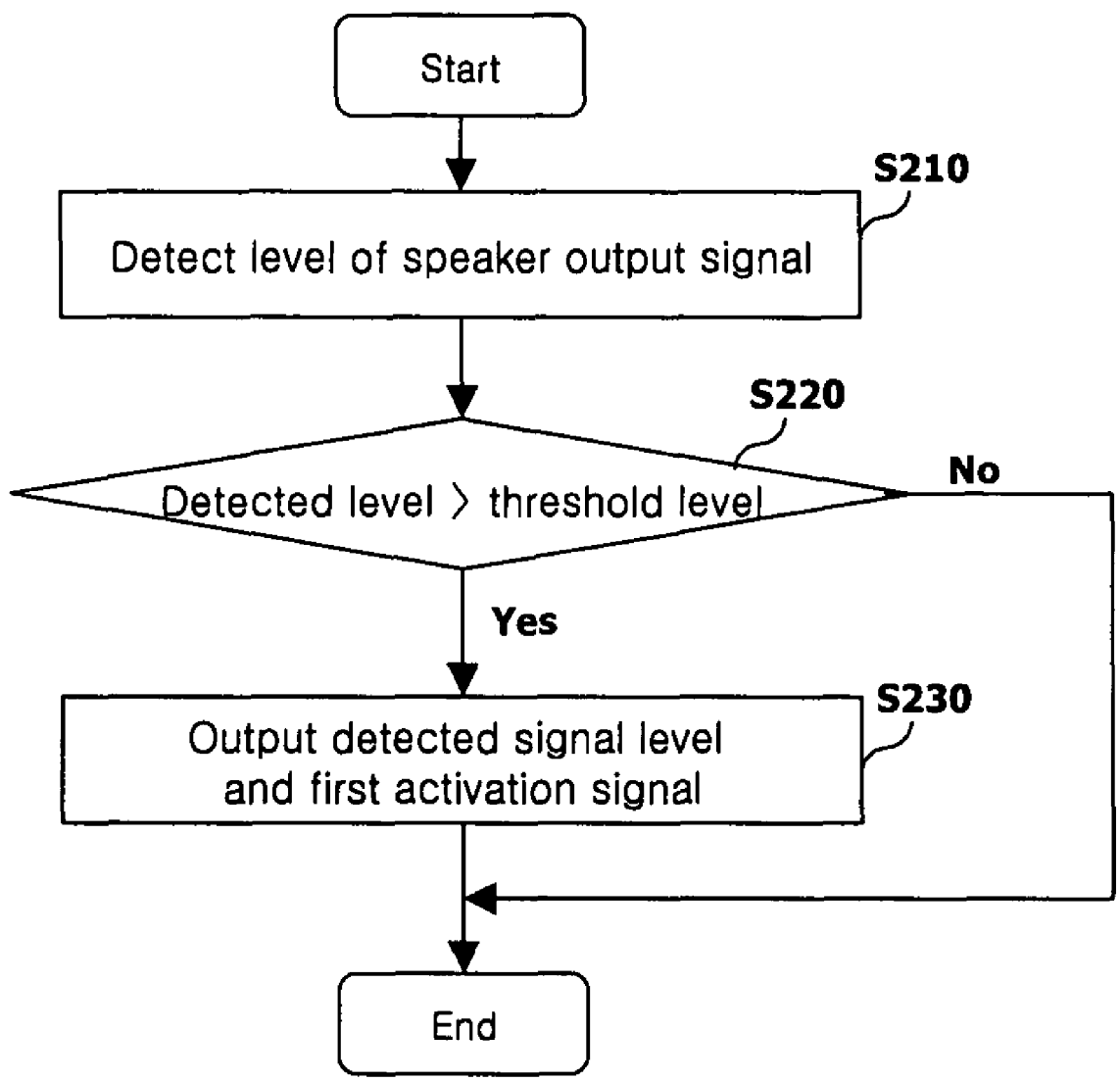
FIG. 5 is a flowchart showing the method steps for detecting speaker output.

FIG. 4 illustrates the method for controlling acoustic echo cancellation according to the present invention. FIG. 5 is a flowchart showing the method for detecting the speaker output. And FIG. 6 is a flowchart showing the method for detecting the signal transmitted through the downlink path.

As depicted in FIG. 4, a digital voice signal received through the downlink path is demodulated by the RF unit and then is filtered in the filter unit 10 for elimination of a noise signal component (S100).

The filtered digital voice signal is inputted to the acoustic echo canceller 70 and is simultaneously transferred to the speaker 30 through the down-analog unit 20.

The level detecting unit 40 detects the level of the voice signal outputted to the speaker 30 and generates the first activation signal to operate the acoustic echo canceller 70 (S200).

That is, as shown in FIG. 5, the level detecting unit 40 uses the detecting unit 41 and the ADC 42 to detect the level of the receiving voice signal which is outputted to the speaker 30 (S210). In addition, the level detecting unit 40 uses the threshold unit 43 to generate the first activation signal when the detected level of the voice signal is greater than the preset threshold level (S220, S230). The detected level of the voice signal and the generated first activation signal are outputted to the acoustic echo canceller 70.

Further, the VAD 71 of the acoustic echo canceller 70 detects the level of the receiving voice signal, which is received through the downlink path, for generating the second activation signal (S300).

That is, as shown in FIG. 6, the VAD 71 detects the level of the inputted filtered digital receiving voice signal, and compares the detected level of the digital receiving voice signal with a preset noise level of the system (S310, S320). When the detected level of the receiving voice signal is greater than the preset noise level of the system, the VAD 71 generates the second activation signal (S330). The logic unit 73 performs an ORing operation on the first activation signal which is outputted from the threshold unit 43 of the level detecting unit 40 and the second activation signal which is outputted from the VAD 71 so as to output an enable signal.

The attenuation value determining unit 74 is operated by the enable signal which is outputted from the logic unit 73, and determines an echo suppression level value (or an attenuation value) corresponding to the level (e.g., Hex code value) of the digitized speaker output stage voice signal which is outputted from the ADC 42 of the level detecting unit 40 from a Hex code table, thusly to output the echo suppression level value to the attenuating unit 75.

Accordingly, the attenuating unit 75 attenuates the output of the up-analog unit 60 according to the attenuation value outputted from the attenuation value determining unit 74, to transmit the transmitting signal through the uplink path (S400).

That is, if an attenuation value is outputted from the attenuation value determining unit 74, the attenuating unit 75 subtracts the receiving voice signal of the same phase applied from the delay unit 72 from the transmitting voice signal applied from the up-analog unit 60. According to the attenuation value, the attenuating unit 75 attenuates the transmitting voice signal. And, if an attenuation value is not inputted from the attenuation value determining unit 74, a voice signal of the same phase is removed based on an existing attenuation value determined according to the level of the receiving voice signal which is detected by the VAD 71.

As described above, the present invention has an effect to improve not only a muting phenomenon or fluctuation of the transmitting signal but also an echo phenomenon occurring during a call, by performing a real-time monitoring of the signal of the speaker output stage and effectively controlling the AEC function to be appropriate to the characteristics of the terminal.

The present invention has been described with an example of a voice signal for the sake of convenience in explanation. However, without being limited to this, signals transmitted and received through an uplink path and a downlink path may include general digital audio signals as well as digital voice (e.g. speech band) signals.

As the present invention may be embodied in various forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for controlling acoustic echo cancellation in a mobile communication terminal, comprising:
   a down-analog unit which converts a digital receiving signal inputted through a downlink path into an analog signal and outputs the converted analog signal to a speaker;
   a level detecting unit which detects a level of the analog signal outputted to the speaker;
   an up-analog unit which converts an analog transmitting signal from a microphone into a digital transmitting signal, for outputting through an uplink; and
   an acoustic echo canceller which detects a level of the digital receiving signal inputted through the downlink path, adaptively determines an attenuation value of the digital transmitting signal based on the level of the analog signal detected by the level detecting unit and the level of the digital receiving signal, and attenuates the digital transmitting signal according to the determined attenuation value,
   wherein the acoustic echo canceller determines the attenuation value of the digital transmitting signal based on a first activation signal generated based on the analog signal and a second activation signal generated based on the digital receiving signal.

2. The apparatus of claim 1, wherein the digital receiving signal and the digital transmitting signal comprise digital voice signals and digital audio signals.

3. The apparatus of claim 1, wherein the level detecting unit compares the level of the analog signal with a preset threshold level, and generates the first activation signal to operate the acoustic echo canceller if the detected level of the analog signal is greater than the preset threshold level.

4. The apparatus of claim 1, wherein the level detecting unit comprises:
   a detecting unit that detects the level of the analog signal which is outputted to the speaker;
   an analog-to-digital converter (ADC) that converts the detected level of the analog signal into a digital value; and
   a threshold unit that compares the detected level of the analog signal with a preset threshold level and outputs the first activation signal for operating the acoustic echo canceller.

5. The apparatus of claim 4, wherein the threshold level is determined experimentally and is adjustable.

6. The apparatus of claim 4, wherein the converted digital value is a Hexadecimal code value of 10-bit resolution.

7. The apparatus of claim 1, wherein the acoustic echo canceller selects the attenuation value, which is mapped to the detected level of the analog signal, from a Hexadecimal code table.

8. The apparatus of claim 1, wherein the acoustic echo canceller comprises:
   a Voice Activity Detector (VAD) that detects the level of the digital receiving signal inputted through the downlink path and compares the detected level of the digital receiving signal with a noise level of a system, for thereby generating the second activation signal;
   a delay unit that delays the digital receiving signal;
   a logic unit that logically operates the first activation signal outputted from the level detecting unit and the second activation signal outputted from the VAD to output an enable signal;
   an attenuation value determining unit that is operated by the enable signal outputted from the logic unit and determines the certain attenuation value based on the level of the analog signal detected in the level detecting unit; and
   an attenuating unit that attenuates the digital transmitting signal according to the attenuation value outputted from the attenuation value determining unit.

9. The apparatus of claim 8, wherein the logic unit comprises an OR gate.

10. The apparatus of claim 8, wherein the attenuating unit subtracts a delayed version of the digital receiving signal of the same phase applied from the delay unit from the digital transmitting signal applied from the up-analog unit if the attenuation value is inputted thereto from the attenuation value determining unit.

11. The apparatus of claim 8, wherein the attenuating unit removes a delayed version of the digital receiving signal of the same phase and attenuates the digital transmitting signal based on a preset attenuation value if the attenuation value is not inputted thereto from the attenuation value determining unit.

12. A method for controlling acoustic echo cancellation in a mobile communication terminal, comprising:
   converting a digital receiving signal into an analog signal;
   detecting a level of the analog signal which is outputted to a speaker;
   converting a voice signal, which is inputted into a microphone, into a digital transmitting signal; and
   detecting a level of the digital receiving signal, adaptively determining a certain attenuation value based on the detected level of the analog signal and the level of the digital receiving signal, and controlling attenuation of the digital transmitting signal according to the determined attenuation value,
   wherein the attenuation value of the digital transmitting signal is determined based on a first activation signal generated based on the level of the analog signal and a second activation signal generated based on the level of the digital receiving signal.

13. The method of claim 12, wherein the analog signal and the digital transmitting signal comprise voice signals and audio signals.

14. The method of claim 12, wherein the detecting the level of the analog signal comprises:
   detecting the level of the analog signal which is outputted to the speaker;
   converting the detected level of the analog signal into a digital value; and
   comparing the detected level of the analog signal with a preset threshold level and outputting the first activation signal for activating an acoustic echo cancellation operation.

15. The method of claim 14, wherein the converted digital value is a Hexadecimal code value of 10-bit resolution.

16. The method of claim 12, wherein the attenuation value corresponds to the detected level of the analog signal and is mapped in advance to a code table.

17. The method of claim 12, wherein the controlling attenuation comprises:
   detecting the level of the digital receiving signal and comparing the detected level of the digital receiving signal with a noise level of a system, for thereby generating the second activation signal for activating an acoustic echo cancellation operation;

delaying the digital receiving signal;

performing an OR operation on the first activation signal generated based on the output level of the analog signal supplied to a speaker and the second activation signal to output an enable signal;

based on the thusly outputted enable signal, determining the attenuation value based on the level of the analog signal which is supplied to the speaker; and attenuating the digital transmitting signal according to the determined attenuation value.

18. The method of claim 17, wherein the delayed digital receiving signal of the same phase is subtracted from the digital transmitting signal if a certain attenuation value is determined.

19. The method of claim 17, wherein the digital transmitting signal is attenuated based on a preset attenuation value if a certain attenuation value is not determined.

\* \* \* \* \*